(12) United States Patent
Lee et al.

(10) Patent No.: US 9,781,992 B2
(45) Date of Patent: Oct. 10, 2017

(54) HIP EXTENSION DEVICE ADAPTED FOR CARRYING OBJECTS

(71) Applicants: Cin-Ty Lee, Houston, TX (US); Yu-Ye Wen, Houston, TX (US)

(72) Inventors: Cin-Ty Lee, Houston, TX (US); Yu-Ye Wen, Houston, TX (US)

( * ) Notice: Subject to any disclaimer, the term of this patent is extended or adjusted under 35 U.S.C. 154(b) by 0 days.

(21) Appl. No.: 15/419,397

(22) Filed: Jan. 30, 2017

(65) Prior Publication Data

US 2017/0215563 A1 Aug. 3, 2017

Related U.S. Application Data

(60) Provisional application No. 62/288,249, filed on Jan. 28, 2016.

(51) Int. Cl.
| | |
|---|---|
| *A45F 5/02* | (2006.01) |
| *A45F 3/14* | (2006.01) |
| *F16M 13/04* | (2006.01) |
| *A47D 13/02* | (2006.01) |

(52) U.S. Cl.
CPC ............... *A45F 5/021* (2013.01); *A45F 3/14* (2013.01); *A47D 13/02* (2013.01); *F16M 13/04* (2013.01); *A45F 2003/142* (2013.01); *A45F 2005/027* (2013.01)

(58) Field of Classification Search
CPC ...... A45F 5/021; A45F 2005/027; A45F 3/14; A45F 2003/142
USPC ........................................................ 224/270
See application file for complete search history.

(56) References Cited

U.S. PATENT DOCUMENTS

| | | | | | |
|---|---|---|---|---|---|
| 1,464,404 | A | * | 8/1923 | Blekastad | A47D 13/025 224/159 |
| 4,319,704 | A | * | 3/1982 | Rosen | A45F 5/02 224/269 |
| 4,901,898 | A | * | 2/1990 | Colombo | A47D 13/025 224/159 |
| 5,421,499 | A | * | 6/1995 | Bauer | A47B 23/002 108/43 |
| D363,598 | S | * | 10/1995 | Walters | D3/213 |
| 5,511,707 | A | * | 4/1996 | Reichert | A45F 5/00 224/242 |
| 5,522,573 | A | * | 6/1996 | Xiao | A45C 13/38 224/267 |
| D393,363 | S | * | 4/1998 | Kataoka | D3/215 |
| 5,826,763 | A | * | 10/1998 | Roberts | B65G 7/12 224/197 |
| 6,045,017 | A | * | 4/2000 | Connell | A45F 5/02 224/148.4 |
| D468,901 | S | * | 1/2003 | Thornber | D3/213 |

(Continued)

*Primary Examiner* — Justin Larson
(74) *Attorney, Agent, or Firm* — Gutwein Law; Greg N. Geiser

(57) ABSTRACT

Described herein is a hip extension device adapted to be worn by a user. The device is secured adjacent to the hip of a user and forms a ledge-like resting surface for the supporting of objects for carrying. The device includes an inner structural member comprised of hingedly coupled rigid plates movable from an open position to a closed position. A removable cover portion is placed around the inner structural member and allows a user access to an inner cavity for the storage of items. A clip portion is coupled to the device to allow for securing to the user's clothing against their body side. To offer additional support, the device may include a strap.

15 Claims, 12 Drawing Sheets

(56) References Cited

U.S. PATENT DOCUMENTS

| | | | | |
|---|---|---|---|---|
| 6,789,344 B2 * | 9/2004 | Cain | ............... | F41C 33/001 |
| | | | | 224/265 |
| 6,789,710 B1 * | 9/2004 | Szatkowski | ......... | A47D 13/025 |
| | | | | 224/159 |
| 7,575,136 B2 * | 8/2009 | Kernkamp | ............ | A45F 3/14 |
| | | | | 224/158 |
| D608,622 S * | 1/2010 | Zhu | ........................ | D6/513 |
| 9,516,941 B1 * | 12/2016 | Moulton | ............... | A45F 5/00 |
| 2003/0089832 A1 * | 5/2003 | Gold | ..................... | A45F 5/02 |
| | | | | 248/454 |
| 2004/0045992 A1 * | 3/2004 | Dohn | ................... | A45F 5/02 |
| | | | | 224/673 |
| 2004/0118883 A1 * | 6/2004 | Fife | ................ | A47D 13/025 |
| | | | | 224/159 |
| 2005/0161479 A1 * | 7/2005 | Licsko | ................ | A45F 3/14 |
| | | | | 224/270 |
| 2007/0017945 A1 * | 1/2007 | Willis | ................ | A45F 3/14 |
| | | | | 224/270 |
| 2007/0125814 A1 * | 6/2007 | Roh | ................ | A45C 11/182 |
| | | | | 224/148.7 |
| 2009/0179055 A1 * | 7/2009 | Estrellado | ............. | A45F 5/02 |
| | | | | 224/269 |

\* cited by examiner

HIP EXTENSION DEVICE ADAPTED FOR CARRYING OBJECTS

CROSS REFERENCE TO RELATED APPLICATIONS

This application claims priority to U.S. Provisional Patent Application No. 62/288,249 filed 28 Jan. 2016 entitled "HIP BOOSTER FOR CARRYING CHILDREN" to the above named inventors, and is herein incorporated by reference in its entirety.

FIELD OF THE INVENTION

The invention relates generally to a seat or ledge-like device for adapted for wearing or placing adjacent to the hip of a wearer to support the weight of a small child or object placed upon the device and held against the wearer's torso.

BACKGROUND

Currently there are a number of solutions for toting children and objects around when a stroller or cart is not suitable. One of these solutions is to carry the child or object without any assistance, but this solution fails to meet the needs of the market because it is difficult to carry a child or object for extended periods of time without any support. Another solution is to carry the child or object on the shoulders, but this solution is similarly unable to meet the needs of the market because this can be unsafe and not suitable for small children who still don't have their balance established and some objects are not amenable to placement on the shoulders. Still another solution seeks to use child-carrying devices such as baby carriers and slings, but this solution also fails to meet market needs because it is difficult to remove a child from the device if the child wants to get down and walk or crawl. Therefore, there is a need in the market for device that offers support and makes the carrying of children and objects easier.

SUMMARY OF THE INVENTION

It would be advantageous to have an apparatus that is added a ledge-like support adapted to be worn adjacent to the hip of a wearer to offer support when carrying around a child or object for a user who needs a little extra help. Furthermore, it would also be advantageous to have an apparatus that is discreet and compact. Still further, it would be advantageous to have an apparatus that can attach to the user's pants via a clip and optional supporting strap. The device can be folded flat and easily stored away when not in use.

The invention is a simple, discreet device that provides a wearer an added support for carrying a small child or heavy or awkward shaped object.

The apparatus has a rigid plastic clip that is adapted to attach within a wearer's pants waistband or belt, wherein the apparatus is closely secured against the wearer's torso. For added security, the apparatus may include a strap that is extended around an opposed shoulder opposite the body side the device is placed upon.

The apparatus includes an inner structural support that provides the general structural elements and shape of the device. This inner structural support includes a clip member, a pair of rigid side members hingedly coupled together, and a connecting member coupled to the side members opposite the hinge, wherein the side members are movable from a folded position to an extended position.

The apparatus inner structural support is surrounded with a cover portion. The cover portion removable for cleaning and providing for interchangeability, wherein the user can change the cover portion to provide an alternate style or pattern. The cover portion further including a zippered portion allowing access to the interior of the device allowing the interior area to function as a cavity for storage when the device is in the extended position. The cover portion including fasteners to aid in securing the device in the folded position.

The apparatus fulfills the need for a support when holding a child or an object against the wearer's hip.

Among other things, it is an advantage of the invention to provide a hip-enhancing seat like device to support the weight of a small child or object when carried on the hip by an adult that does not suffer from any of the problems or deficiencies associated with prior solutions.

It is still further an advantage of the invention to come with a variety of outer covers to change the look of the product. Further, the cover member may include an attachment surface allowing for the affixing of objects or trinkets, such as stuffed animal characters, to increase usability and enjoyment of the device.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
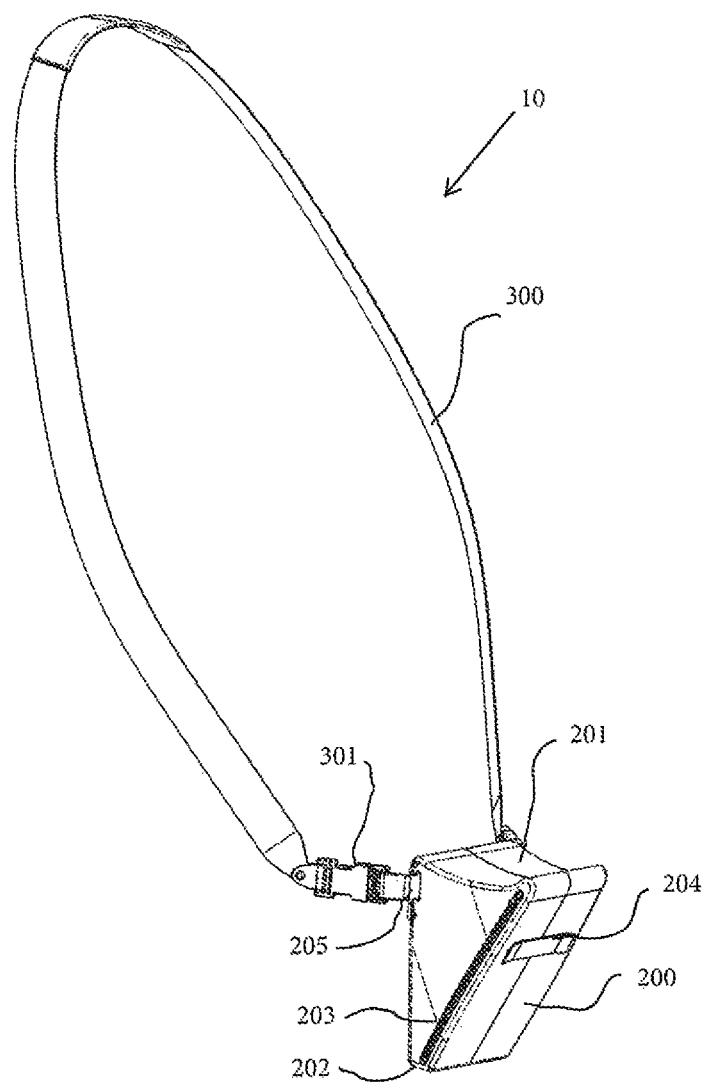
FIG. 1 is an isometric view of the device with the strap, according to the present invention.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful, and is not intended to exclude other embodiments from the scope of the invention.

These terms are not meant to limit the elements that they describe, as the various elements may be oriented differently in various applications.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The invention is directed to be a ledge-like, hip-enhancing device to support the weight of a small child or object when carried adjacent to the hip of an adult.

The apparatus of the present invention is generally comprised of an inner structural support comprising an internal skeleton of the device and an external cover portion surrounding the inner structural support. The inner structural support is preferably constructed out of a pair of rigid plastic members hingedly coupled together at a first end and movable from a folded (closed) state to extended (open) state, wherein in the open state, the plates make a narrow V-shape. In the closed state, the two plates are flush against each other. A free end of the pair of inner structural members, opposite the hinge portion are coupled together through a bridging portion forming a seat portion when the plates are arranged in an open state. Preferably this bridging portion is canvas or canvas-like material for strength and durability.

The device attaches to a wearer's belt with a long clip that is connected to the backside of one of the support members of the pair of support members. This clip slides into the wearer's waistband or over a belt when in use. The weight of the child or object is supported by the bridging member extending across the free end of the open plates. A shoulder strap is provided to give additional support if needed. The device is not meant to freely support a child or object. The child or object rested must still be held by at least one arm. The device is meant only to help support the carrying of the child or object.

Figure 2:
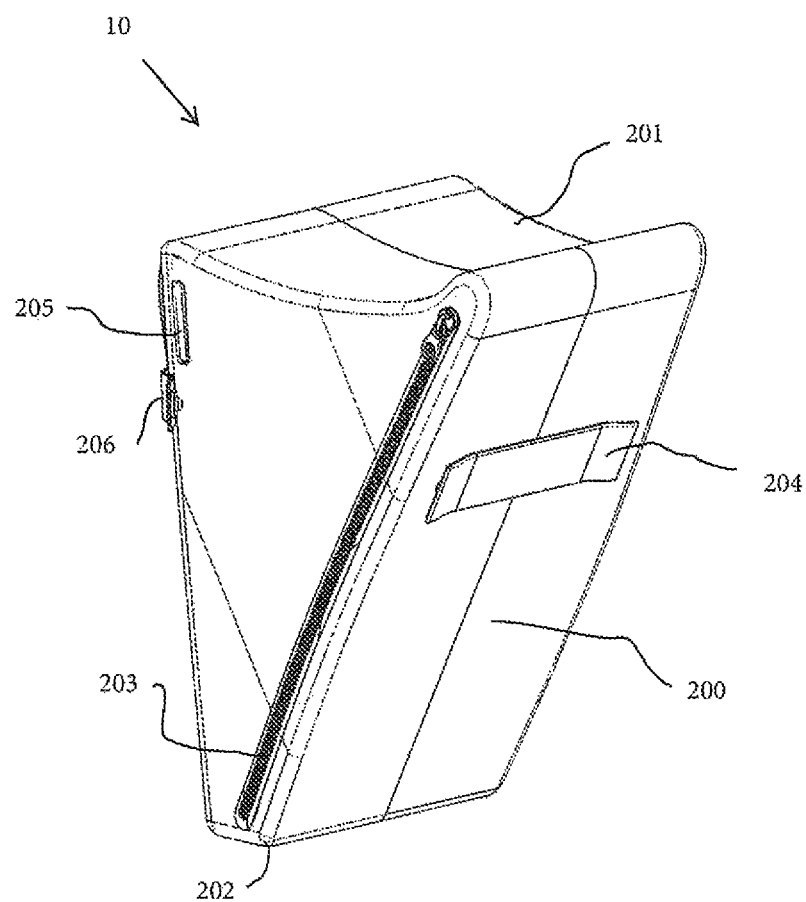
FIG. 2 is an isometric view of the device without the strap, according to the present invention.
Figure 3:
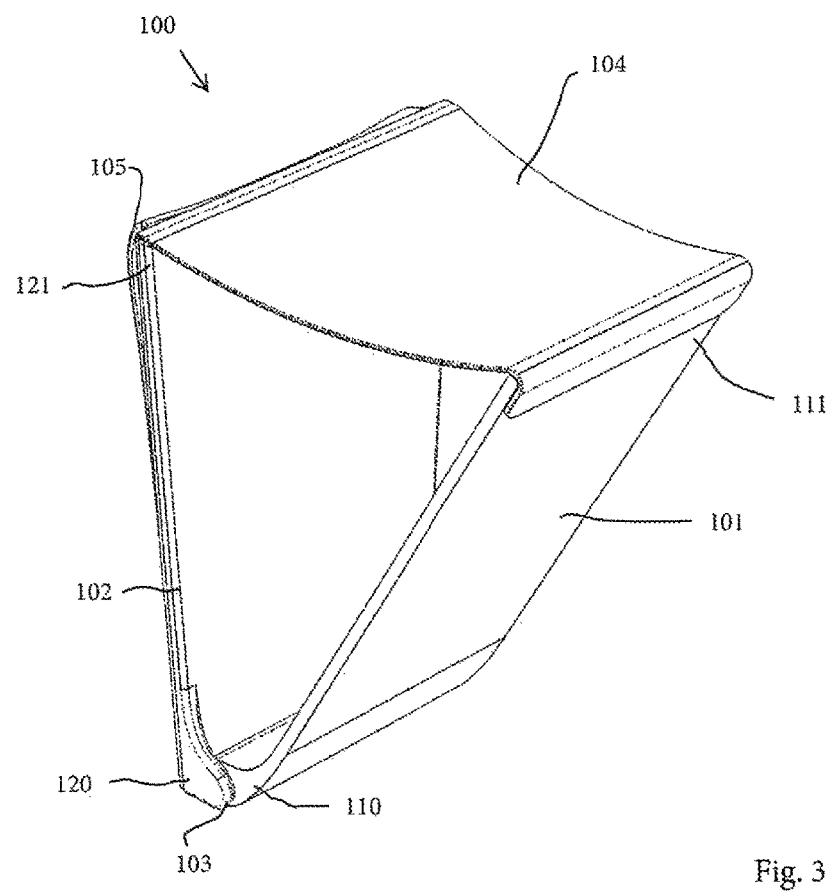
FIG. 3 is an isometric view of the internal structure of the device, according to the present invention.
Figure 4:
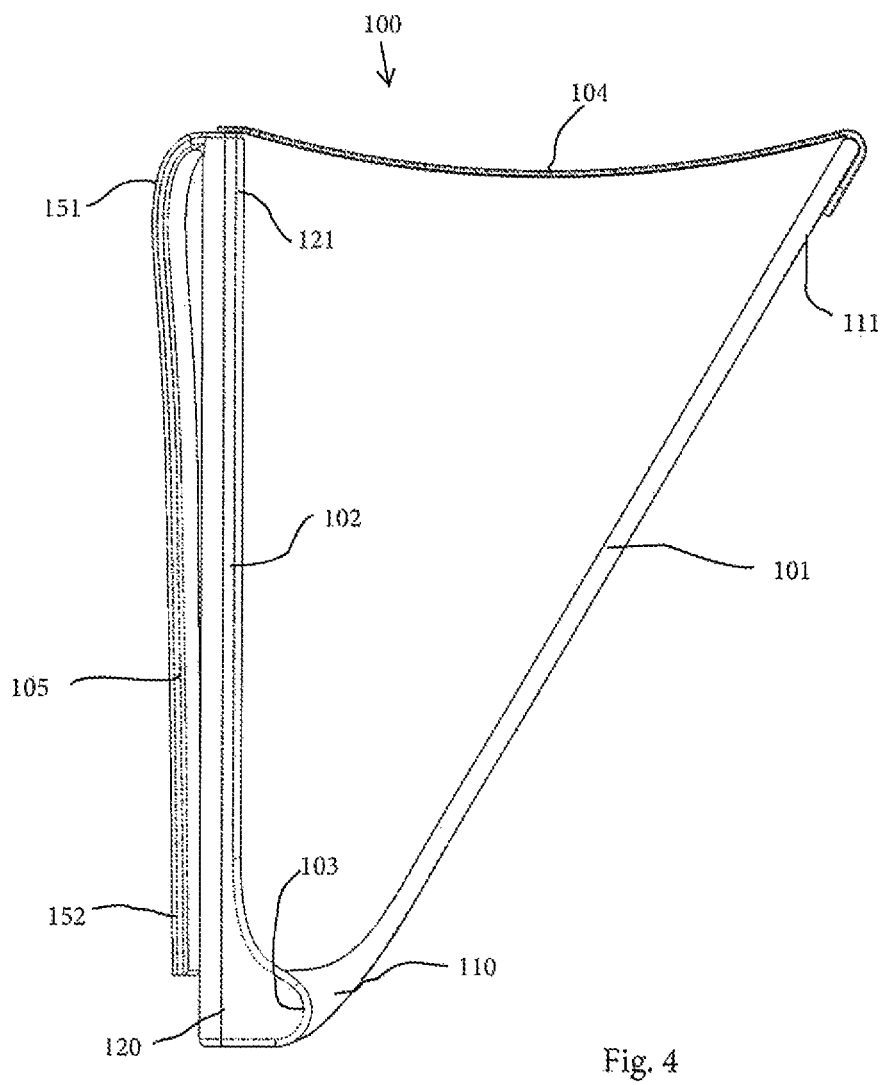
FIG. 4 is a side view of the internal structure of the device, according to the present invention.
Figure 5:
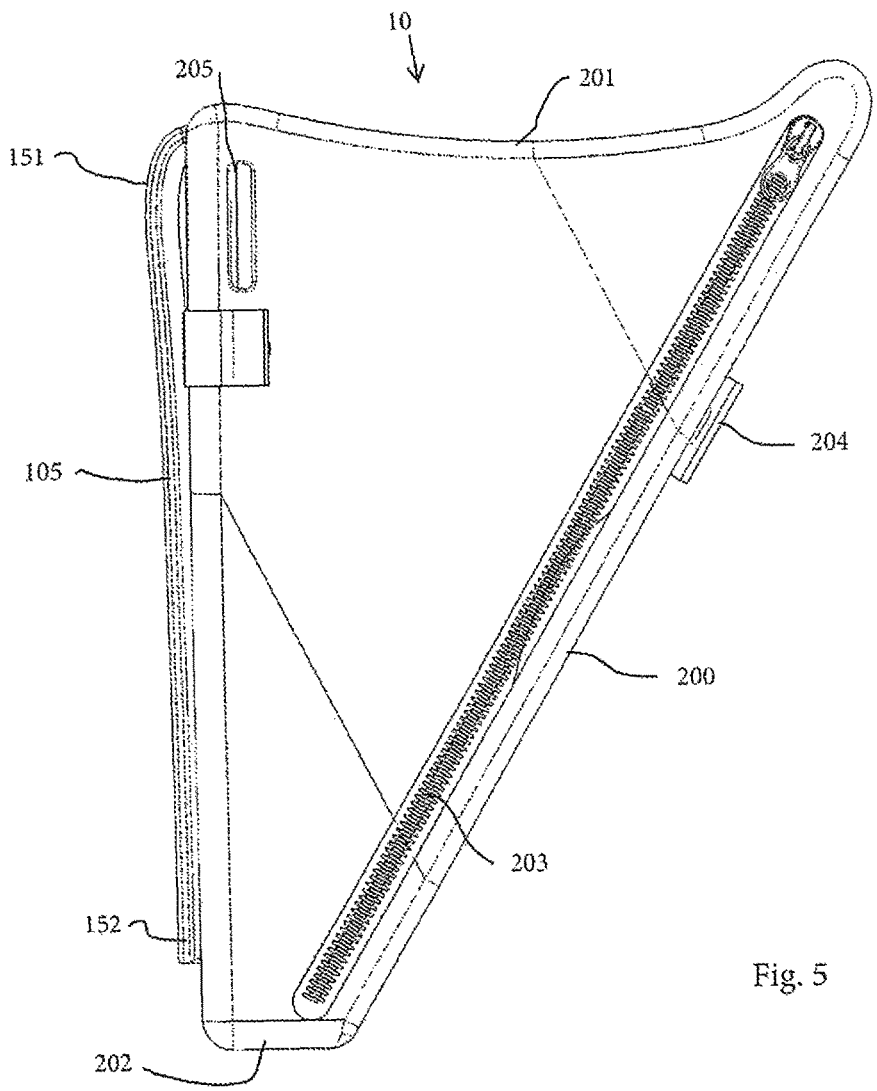
FIG. 5 is a side view of the device with the cover member installed, according to the present invention.
Figure 6:
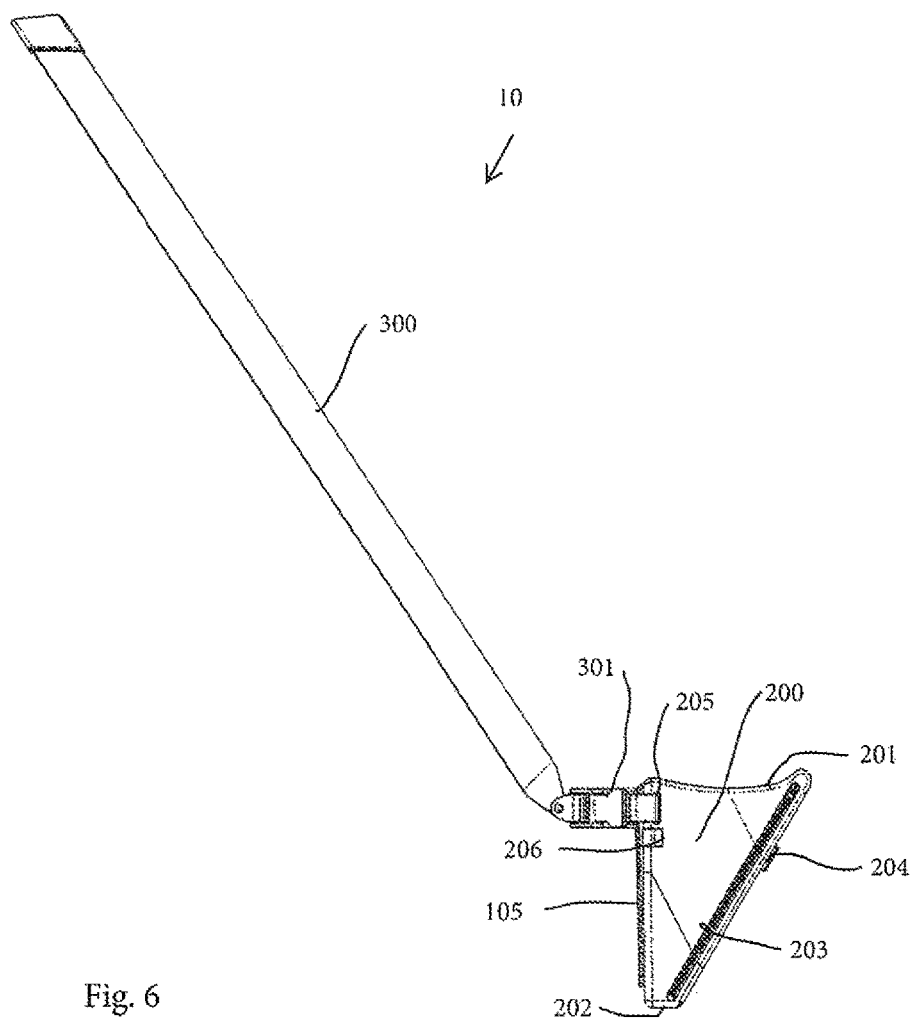
FIG. 6 is a side view of the device with the strap, according to the present invention.
Figure 7:
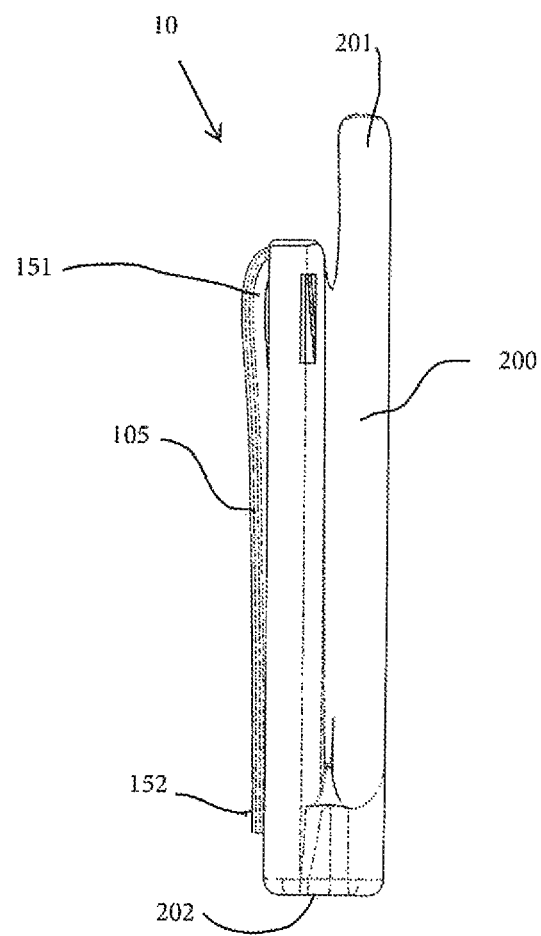
FIG. 7 is a side view of the device without the strap in a folded position, according to the present invention.
Figure 8:
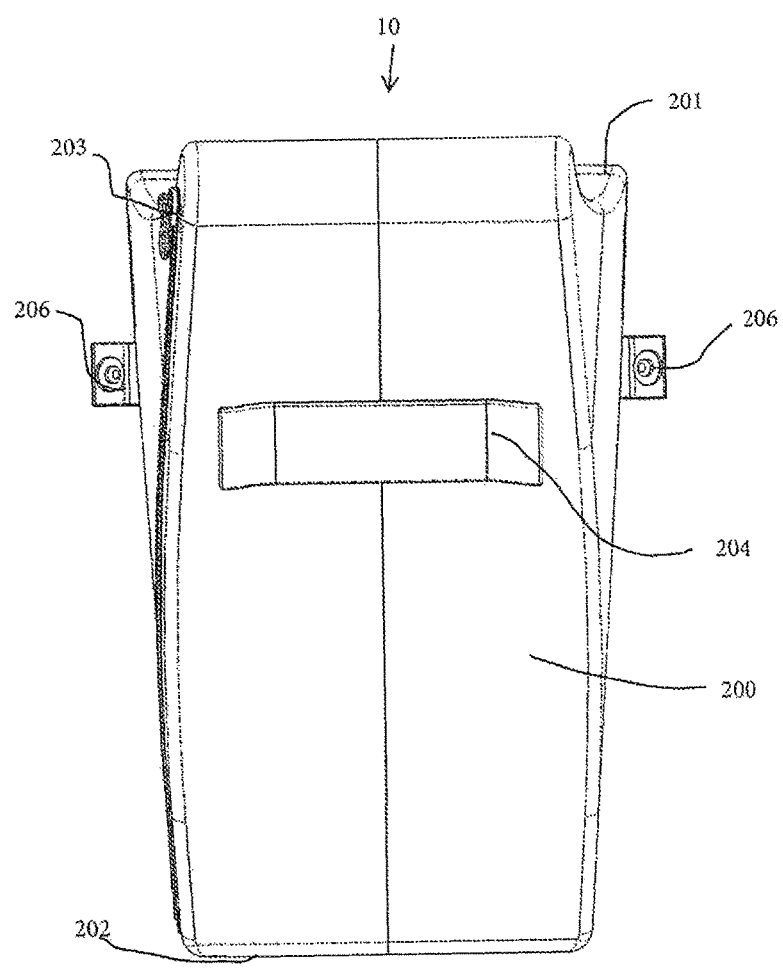
FIG. 8 is an end view of the device, according to the present invention.
Figure 9:
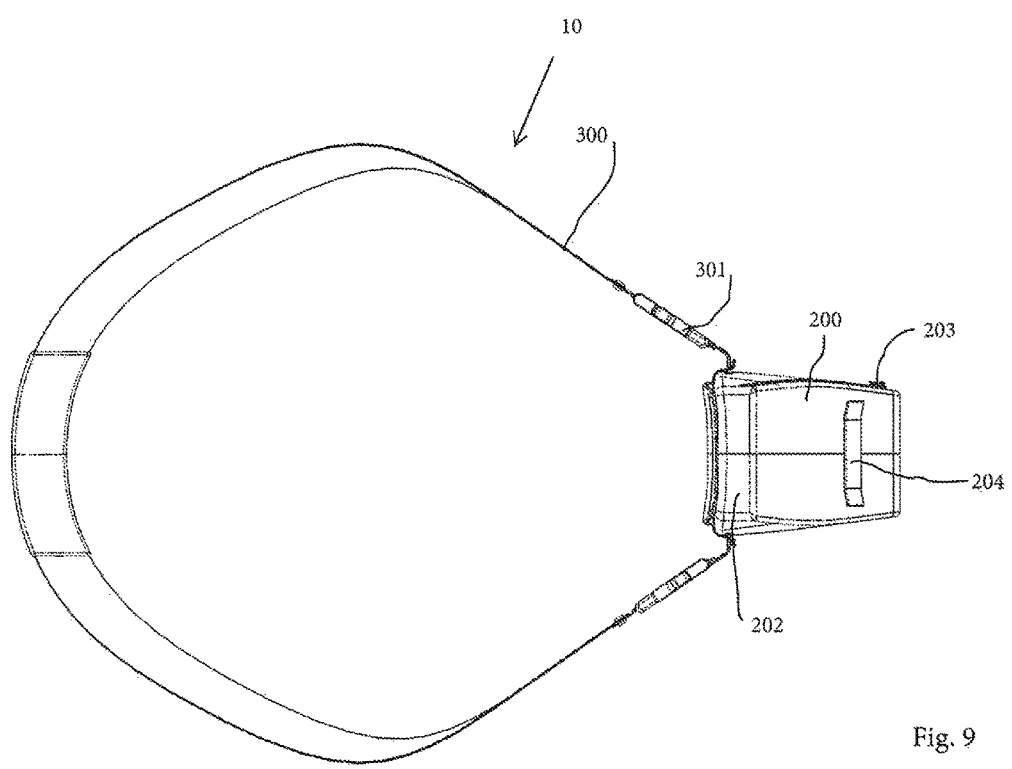
FIG. 9 is a bottom view of the device with the strap, according to the present invention.
Figure 10:
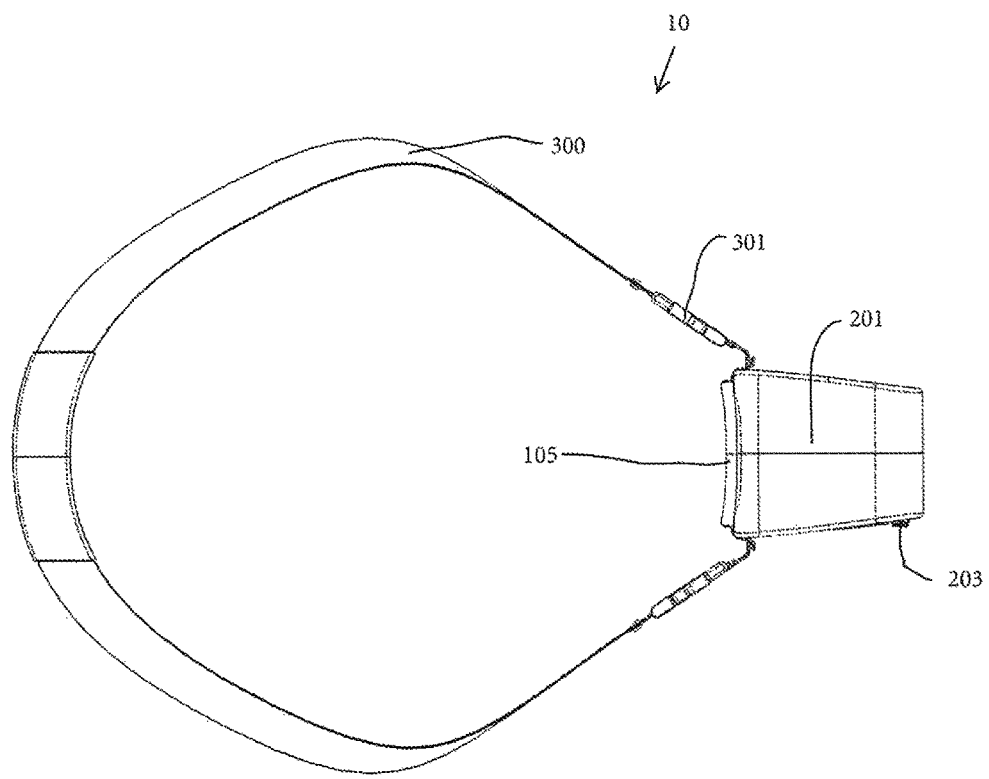
FIG. 10 is top view of the device with the strap, according to the present invention.
Figure 11:
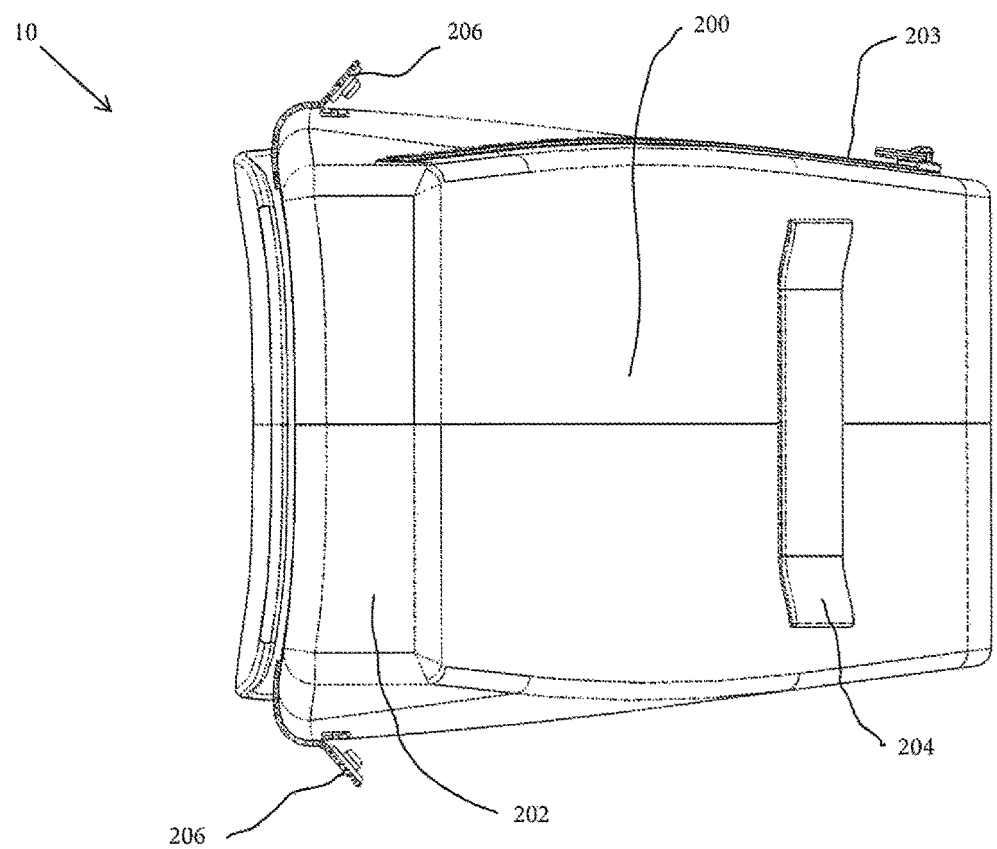
FIG. 11 is a bottom view of the device, according to the present invention.
Figure 12:
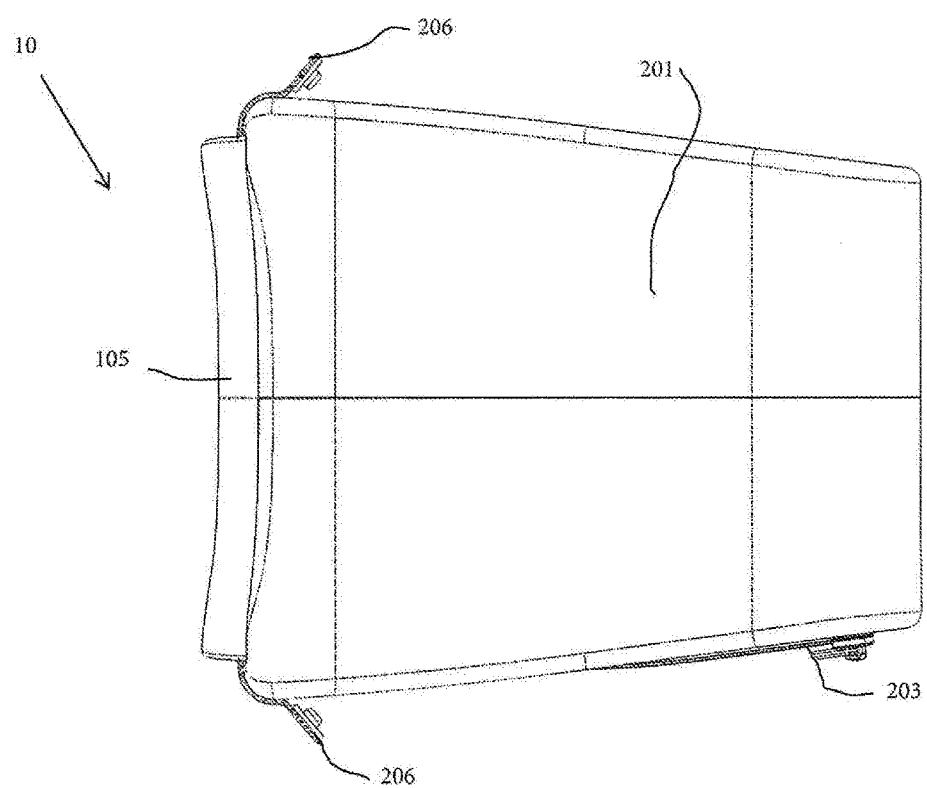
FIG. 12 is a top view of the device, according to the present invention.

Referring to the figures, FIGS. 1-12 show various views and images of the internal and external features of the hip extension device of the present invention and generally referred to as device 10. The device 10 is adapted to be worn by a user (wearer) adjacent to the hip region of the user and provides a ledge-like or seat-like support to providing a resting support for a child or object against the torso of the wearer.

The device 10 is comprised of an inner structural support 100 (FIGS. 3-4) forming a skeleton-like frame for the device 10. The inner structural support 100 is comprised of a first plate 101 and second plate 102 in hinged coupling through a hinge 103 and movable from a closed position to an open position. The first plate 101 and second plate 102 are constructed of a rigid material and generally arranged in a V-shape when in the open position with the hinge 103 positioned at a vertex of the V-shape, wherein the first plate 101 and second plate 102 are movable from a closed position (FIG. 7) where the first plate 101 and second plate 102 are positioned parallel to each other to an open position where the first plate 101 and second plate are arranged angularly in the V-shape.

The first plate 101 includes a first end 110 and second end 111 opposite the first end 110. The second plate 102 includes a first end 120 and second end 121 opposite the first end 120. The first plate 101 first end 110 and second plate 102 first end 120 are hingedly coupled through communication with the hinge 103.

The first plate 101 second end 111 and second plate 102 second end 121 are positioned opposed the hinge 103 and coupled together though a bridging member 104. The bridging member 104 comprised of a flexible material, preferably a canvas or canvas like material, wherein the bridging member 104 functions as the resting or seat portion of the device and is securely affixed to the second ends 111 and 121.

A clip 105 is positioned along a back side of the second plate 102 opposite the hinge 103. The clip 105 having an attached end 151 on the second end 121 of the second plate 102 and a free end 152 adjacent to the first end 120 of the second plate 102. The clip 105 providing a grasping force against the back side of the second plate 102, wherein the clip 105 free end 152 is slidably received within a waistband or belt of the wearer and wherein the clip 105 is adapted to secure the device 10 against the hip and torso region of the wearer.

The device 10 includes a cover portion 200. The cover portion 200 sized and shaped to surround the inner structural portion 100 and removable to allow for washing and interchanging. The cover portion 200 has a top side 201 and bottom side 202 positioned opposite the top side 201. The bottom side 202 aligned with the hinge 103 of the inner structural portion 100 and forming a generally narrow end of the device. The top side 201 positioned over the bridging member 104 and representing the resting surface a child or object is placed upon when the device 10 is positioned in the open position during use.

When the device 10 is placed in the open position, an internal cavity is formed between the first plate 101 and the second plate 102 and above the hinge 103 and bridging member 104. When the cover 200 is placed over the inner structural portion 100 for use, this inner cavity is accessible through an opening 203 formed in a side of the cover 200. Preferably, this opening 203 is secured through a zipper.

The cover portion 200 includes a pair of apertures 205 positioned on a pair of opposed sides of the cover portion adjacent the attached end 151 of the clip 105. The pair of apertures 205 sized and shaped to receive a pair of clips 301. The clips 301 receiving corresponding clips for a strap 300. The strap 300 extending between the pair of clips 301 and sized to engage the opposed shoulder of the wearer opposite the hip the device 10 is placed adjacent to. Preferably, the strap 300 is constructed out of a nylon webbing material or nylon webbing-like material.

The cover portion 200 further includes a pair of fasteners 206 positioned below the pair of apertures 205. The pair of fasteners 206 designed to engage the cover portion and secure the device 10 in a closed position. Preferably, the pair of fasteners 206 are snaps.

An end of the cover portion 200 includes an attachment surface 204. The attachment surface 204 providing a location and material for the attachment of additional objects. These objects may include, but not be limited to, stuffed animals, souvenirs, trinkets, or other similar items that may be desirable or attract the attention of young children.

In use, the device 10 is adapted to worn adjacent to the hip region of a wearer. Accordingly, the free end 152 of the clip 105 is placed within the waistband or behind a belt worn by the wearer to secure the device 10 in position. The device 10 is then placed into the open position wherein the bridging portion 104 and cover 200 top side 201 provide a resting surface for an object or child during use. To further secure the device 10 to the wearer, the strap 300 may be affixed to the device 10 and secured around a shoulder of the wearer opposite the hip the device 10 is placed adjacent to. In its open position the device 10 inner cavity can be used to store objects and accessed through the opening 203 in the cover 200. When the device 10 is not in use, the user can place the device 10 into the folded position and secured in this position through the fastener 206.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A supporting device adapted to worn adjacent to a hip of a wearer, the supporting device comprising:
   an inner structure, the inner structure comprised of a pair of rigid members in hinged communication through a hinge positioned at a first end of the pair of rigid members, the rigid members movable from a closed position wherein the rigid members are aligned parallel to each other to an open position wherein the rigid members are positioned separate and angular;
   a cover member, the cover member surrounding the inner structure; and
   a clip, the clip positioned on a rigid member opposite the hinge, the clip adapted to secure the device against the body of the wearer by engaging a clothing member worn by the wearer.

2. A supporting device, as in claim 1, wherein the device includes a strap, the strap extending around an opposed shoulder of the wearer opposite the body side the device is positioned.

3. A supporting device as in claim 1, wherein the cover member is removable.

4. A supporting device as in claim 1, wherein the cover member includes an opening, the opening allowing access to an inner cavity, the inner cavity formed between the rigid members when in the open position.

5. A supporting device as in claim 4, wherein the cover member includes a fastener, the fastener securing the device in the closed position.

6. A supporting device, the supporting device adapted to worn adjacent to a hip of a wearer, the supporting device forming a ledge providing resting support for an object, the device comprising:
   an inner structural support, the inner structural support comprising:
   a first plate, the first plare being rigid and having a first end and a second end;
   a second plate, the second plate being rigid and having a first end and a second end, the first end of the first plate hingedly coupled to the first end of the second plate, wherein the first plate and second plate are movable between an open position and a closed position;

a bridging member, the bridging member flexible and connecting the second end of the first plate and the second end of the second plate, wherein the bridging member forms the resting support;

a cover member, the cover member removable and sized and shape to surround the inner structural support; and a clip, the clip coupled to the inner structural support, the clip adapted to secure the device against the body portion of the wearer by engaging the clothing of the wearer.

7. A device as in claim 6, wherein the device includes a strap, the strap extending around an opposed shoulder of the wearer opposite the body side the device is positioned.

8. A device as in claim 6, wherein the cover member includes an opening, the opening allowing access to an inner cavity, the inner cavity formed between the rigid members when in the open position.

9. A device as in claim 8, wherein the cover member includes a fastener, the fastener securing the device in the closed position.

10. A device as in claim 6, wherein the clip is integral to the second plate.

11. A supporting device, the supporting device adapted to worn adjacent to a hip of a wearer, the supporting device forming a ledge providing resting support for an object, the device comprising:

an inner structural support, the inner structural support comprising:

a first plate, the first plate being rigid and having a first end and a second end;

a second plate, the second plate being rigid and having a first end and a second end, the first end of the first plate hingedly coupled to the first end of the second plate, the first plate and second plate movable between a V-shaped open position and a closed position;

a bridging member, the bridging member flexible and connecting the second end of the first plate and the second end of the second plate, wherein the bridging member forms the resting support; and an inner cavity, the inner cavity formed between the first plate, the second plate, and the bridging member in the V-shaped open position;

a cover member, the cover member removable and sized and shape to surround the inner structural support, the cover member having an opening, the opening providing access to the inner cavity; and a clip, the clip coupled to the inner structural support, the clip adapted to secure the device against the body portion of the wearer by engaging the clothing of the wearer.

12. A device as in claim 11, wherein the device includes a strap, the strap extending around an opposed shoulder of the wearer opposite the body side the device is positioned.

13. A device as in claim 11, wherein the cover member opening is secured with a zipper.

14. A device as in claim 11, wherein the cover member includes a fastener, the fastener securing the device in the closed position.

15. A device as in claim 11, wherein the clip is integral to the second plate.

* * * * *